(12) United States Patent
Kishi

(10) Patent No.: US 7,929,757 B2
(45) Date of Patent: Apr. 19, 2011

(54) IMAGE PROCESSING APPARATUS AND IMAGE PROCESSING METHOD FOR GATHERING VECTOR DATA FROM AN IMAGE

(75) Inventor: Hiroki Kishi, Chiba-Ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 11/761,058

(22) Filed: Jun. 11, 2007

(65) Prior Publication Data

US 2007/0286478 A1    Dec. 13, 2007

(30) Foreign Application Priority Data

Jun. 12, 2006  (JP) ................................. 2006-162808
Apr. 13, 2007  (JP) ................................. 2007-106366

(51) Int. Cl.
*G06K 9/62* (2006.01)
(52) U.S. Cl. ........ 382/166; 382/239; 382/241; 382/242; 382/243
(58) Field of Classification Search ........................ None
See application file for complete search history.

(56) References Cited

U.S. PATENT DOCUMENTS

| | | | | |
|---|---|---|---|---|
| 5,007,098 A * | 4/1991 | Kumagai | ...................... | 382/185 |
| 5,325,441 A * | 6/1994 | Hoecker | ...................... | 382/113 |
| 6,847,735 B2 | 1/2005 | Kajiwara et al. | ............... | 382/233 |
| 6,879,726 B2 | 4/2005 | Sato et al. | ...................... | 382/239 |
| 6,879,727 B2 | 4/2005 | Sato et al. | ...................... | 382/239 |
| 6,917,716 B2 | 7/2005 | Kajiwara et al. | ............... | 382/240 |
| 6,947,600 B1 | 9/2005 | Sato et al. | ...................... | 382/233 |
| 6,950,471 B2 | 9/2005 | Kishi | ...................... | 375/240.19 |
| 6,993,198 B2 | 1/2006 | Kishi | ............................ | 382/240 |
| 2005/0100226 A1 | 5/2005 | Kajiwara et al. | ........... | 382/232 |
| 2005/0276500 A1 | 12/2005 | Nakayama et al. | ........... | 382/251 |
| 2005/0276501 A1 | 12/2005 | Nakayama et al. | ........... | 382/251 |
| 2007/0127826 A1 | 6/2007 | Kishi | ............................ | 382/232 |
| 2007/0160299 A1 | 7/2007 | Kajiwara et al. | ............... | 382/240 |
| 2008/0089413 A1 | 4/2008 | Kishi et al. | ............... | 375/240.13 |
| 2010/0033745 A1 * | 2/2010 | Dai et al. | ........................ | 358/1.9 |

FOREIGN PATENT DOCUMENTS

JP    2004-246577    9/2004
JP    2004-265384    9/2004

* cited by examiner

*Primary Examiner* — Brian P Werner
(74) *Attorney, Agent, or Firm* — Fitzpatrick, Cella, Harper & Scinto

(57) ABSTRACT

If the processing time of a labeling process performed on a target rectangle found to be an image of a character/line drawing is equal to or longer than a given threshold, an unprocessed region of the target rectangle which has not yet been labeled is analyzed (S401). In accordance with the analytical result, a color reducing process or resolution reducing process is performed on the unprocessed region (S402, S403, S404). A labeling process is performed on the processing result (S302). Vector data is generated on the basis of the labeling process result (S306).

16 Claims, 18 Drawing Sheets

ORIGINAL IMAGE    COLOR REDUCTION RESULT

ORIGINAL IMAGE    LOW-RESOLUTION IMAGE

IMAGE PROCESSING APPARATUS AND IMAGE PROCESSING METHOD FOR GATHERING VECTOR DATA FROM AN IMAGE

BACKGROUND OF THE INVENTION

1. Field of the Invention

The present invention relates to a vector encoding technique.

2. Description of the Related Art

Vectorization is a technology that achieves the reuse of scanned images in systems such as copying machines and multifunction peripherals. Application examples of vectorization are disclosed in Japanese Patent Laid-Open Nos. 2004-246577 and 2004-265384. To increase the efficiency of reuse, demands have arisen for vectorization of images from which scan noise is removed.

On the other hand, noise removal sometimes removes necessary data, e.g., fine dots such as halftone dots. Thus, original scanned images are necessary to print out high-quality images.

On the basis of the prior art explained above, the present applicant has developed a hierarchical encoding using a vectorization process, such as is explained hereinafter.

FIG. 11 is a block diagram showing the functional configuration of a controller of an image processing apparatus, e.g., a copying machine or multifunction peripheral. FIG. 12 is a flowchart of processing performed by the controller of the image processing apparatus. The operation of each unit shown in FIG. 11 will be explained hereinafter, with reference to FIG. 12.

A determination unit 1104 receives output image data from a scanning unit, and segments the input image into a plurality of rectangles, i.e., rectangular images. FIG. 12 is a flowchart of processing performed on each segmented rectangle. Although processing of a target rectangle will be explained hereinafter, other rectangles are also similarly processed.

In step S1201, the determination unit 1104 determines whether the target rectangle is a character/line image, or a natural image. If the target rectangle contains both a character/line image and a natural image, the determination unit 1104 determines that the target rectangle is a natural image.

If the determination unit 1104 determines that the target rectangle is a natural image, the process advances to step S1202, wherein a bitmap compressor 1106 compresses the target rectangle in accordance with the JPEG international standard. In step S1203, the bitmap compressor 1106 stores the compressed target rectangle on a hard drive 1107.

In step S1204, a bitmap decompressor 1113 reads out the stored compressed target rectangle from the hard drive 1107, and decompresses the readout rectangle in synchronism with the timing of printing performed by a printing engine, i.e., a printer. The decompressing process corresponds to the foregoing compressing process.

In step S1205, an image processor 1112 performs a variety of types of image processing on the decompressed target rectangle. In step S1206, the image processor 1112 outputs the processed target rectangle to the printing engine.

On the other hand, if the determination unit 1104 determines in step S1201 that the target rectangle is a character/line image, the process advances to step S1207, wherein the determination unit 1104 transmits a copy of the image of the target rectangle to a difference image generator 1110. In step S1208, the determination unit 1104 transmits the original target rectangle to a PDL-like image generator 1105.

The PDL-like image generator 1105 removes noise from the received target rectangle. The reason is that an image received from a scanner typically contains scan noise, and the encoding amount increases if this noise is vectorized.

Subsequently, in step S1209, a vector processor 1108 vectorizes the image from which the noise is removed by the PDL-like image generator 1105, i.e., the image is converted into vector data. In step S1210, the vector processor 1108 stores the result of this vectorization process on the hard drive 1107. The vector processor 1108 has an arrangement shown in FIG. 13.

FIG. 13 is a block diagram showing the arrangement of the vector processor 1108. As shown in FIG. 13, the vector processor 1108 has a labeling unit 1301 and vectorizing unit 1302.

As shown in FIG. 14, the labeling unit 1301 extracts objects, e.g., characters, gradation regions, and the background, from the target rectangle by using the well-known labeling technique. The vectorizing unit 1302 vectorizes the objects extracted by the labeling unit 1301, and stores the resulting vectorized data on the hard drive 1107.

Following is a brief description of the processing performed by the labeling unit 1301. The labeling unit 1301 scans pixels of each line forming the target rectangle, regards almost equal pixel values as a uniform color, and stores, in a table, the start position (Xstart), end position (Xend), and color information of a section regarded as having a uniform color. For example, if pixels having monochrome values are arranged in the order of (130, 130, 129, 129, 131, 131, 130, 130, 130, 129) in positions (x, y)=(0, 0) to (0, 9), the labeling unit 1301 stores information Xstart=(0, 0), Xend=(0, 9), level=130 in the table for the section.

Subsequently, when completely performing the processing on all lines in the target rectangle, the labeling unit 1301 generates a uniform-color region by connecting uniform-color sections that contact each other across the lines. The labeling unit 1301 regards the uniform-color region as an object, and notifies the vectorizing unit 1302 of information of coordinates forming the contour of each object.

In step S1211 of FIG. 12, the vectorized data stored on the hard drive 1107 in step S1210 is copied, and the copied vectorized data is output to a vector renderer 1109. The vector renderer 1109 restores the image in the target rectangle on the basis of the received vectorized data. The target rectangle restored from the vector data is called a vector restored image. The vector renderer 1109 sends the vector restored image to the difference image generator 1110.

In step S1212, the difference image generator 1110 receives the original target rectangle from the determination unit 1104, and generates a difference image by calculating a difference between the image of the original target rectangle and the vector restored image. Pixels forming the difference image have difference pixel values between the pixels corresponding to the original target rectangle and the pixels corresponding to the vector restored image.

In step S1213, the bitmap compressor 1106 compresses the difference image. In step S1214, the bitmap compressor 1106 stores the compressed difference image in the hard drive 1107.

In step S1215, the vector renderer 1109 generates a vector restored image on the basis of the vectorized data that is stored on the hard drive 1107 in step S1210, and sends the image to a synthesizer 1111. In addition, the bitmap decompressor 1113 decompresses the compressed difference image that is stored on the hard drive 1107 in step S1214, and sends the decompressed image to the synthesizer 1111, which synthesizes the difference image decompressed by the bitmap decompressor 1113 and the vector restored image restored by the vector renderer 1109.

The vector restored image is an image that is restored on the basis of the vector data generated from the image obtained by removing noise from the target rectangle. Accordingly, necessary information, e.g., halftone dots, is sometimes removed by the noise removal. This makes the vector restored image inadequate as a printout image in some cases. When using the vector data in printing, therefore, the synthesizer 1111 synthesizes the vector restored image and the difference image to form a printout bitmap, which it sends to the image processor 1112.

In step S1205, the image processor 1112 performs various types of image processing on the printout bitmap. In step S1206, the image processor 1112 outputs the processed printout bitmap to the printing engine.

As per the foregoing, the processing performed by the labeling unit 1301 generally comprises determining a uniform-color region, storing information of the region, and identifying an object. The operations increase the processing load, and sometimes lower the processing speed required of the whole system. Accordingly, establishing a system that increases the speed of the vectorization process is a significant concern.

SUMMARY OF THE INVENTION

The present invention has been made in consideration of the foregoing problem, and has as its object to provide a technology that increases the speed of a vectorization process.

According to one aspect of the present invention, an image processing apparatus, comprising:

a labeling unit adapted to execute a labeling process for specifying at least one object region contained in a received image; and a vectorizing unit adapted to generate vector data on the basis of a result of labeling by the labeling unit;

wherein, if the labeling unit determines that the labeling process takes a time not less than a first threshold, the labeling unit executes the labeling process on a color-reduced image or low-resolution image of the received image.

According to another aspect of the present invention, an image processing apparatus, comprising:

a labeling unit adapted to execute a labeling process for specifying at least one object region contained in a received image; and a vectorizing unit adapted to generate vector data on the basis of a result of labeling by the labeling unit; wherein, if an amount of the vector data generated by the vectorizing unit is large, one of a color-reduced image and low-resolution image of the received image is used to control the labeling unit and the vectorizing unit to execute the labeling process and a vector data generation process, respectively.

According to still another aspect of the present invention, an image processing method, comprising:

a labeling step, which is executed by labeling unit, of executing a labeling process for specifying at least one object region contained in a received image; and a vectorizing step, which is executed by vectorizing unit, of generating vector data on the basis of a result of labeling by the labeling unit;

wherein, if it is determined in the labeling step that the labeling process takes a time not less than a first threshold, the labeling process is executed on one of a color-reduced image and a low-resolution image of the received image.

According to yet another aspect of the present invention, an image processing method, comprising:

a labeling step, which is executed by a labeling unit, of executing a labeling process for specifying at least one object region contained in a received image; and a vectorizing step, which is executed by a vectorizing unit, of generating vector data on the basis of a result of labeling by the labeling unit;

wherein, if an amount of the vector data generated in the vectorizing step is large, one of a color-reduced image and a low-resolution image of the received image is used to control the labeling unit and the vectorizing unit to execute the labeling process and a vector data generation process, respectively.

According to still yet another aspect of the present invention, a computer-readable storage medium storing a computer program which causes a computer to execute:

a labeling step of executing a labeling process for specifying at least one object region contained in a received image; and a vectorizing step of generating vector data on the basis of a result of labeling of the labeling step;

wherein, if it is determined in the labeling step that the labeling process takes a time not less than a first threshold, the labeling process is executed on one of a color-reduced image and a low-resolution image of the received image.

According to yet still another aspect of the present invention, a computer-readable storage medium storing a computer program which causes a computer to execute:

a labeling step of executing a labeling process for specifying at least one object region contained in a received image; and a vectorizing step of generating vector data on the basis of a result of labeling of the labeling step;

wherein, if an amount of the vector data generated in the vectorizing step is large, one of a color-reduced image and a low-resolution image of the received image is used to execute the labeling process of the labeling step and a vector data generation process of the vectorizing step, respectively.

Further features of the present invention will become apparent from the following description of exemplary embodiments, with reference to the attached drawings.

DESCRIPTION OF THE EMBODIMENTS

First Embodiment

Figure 5:
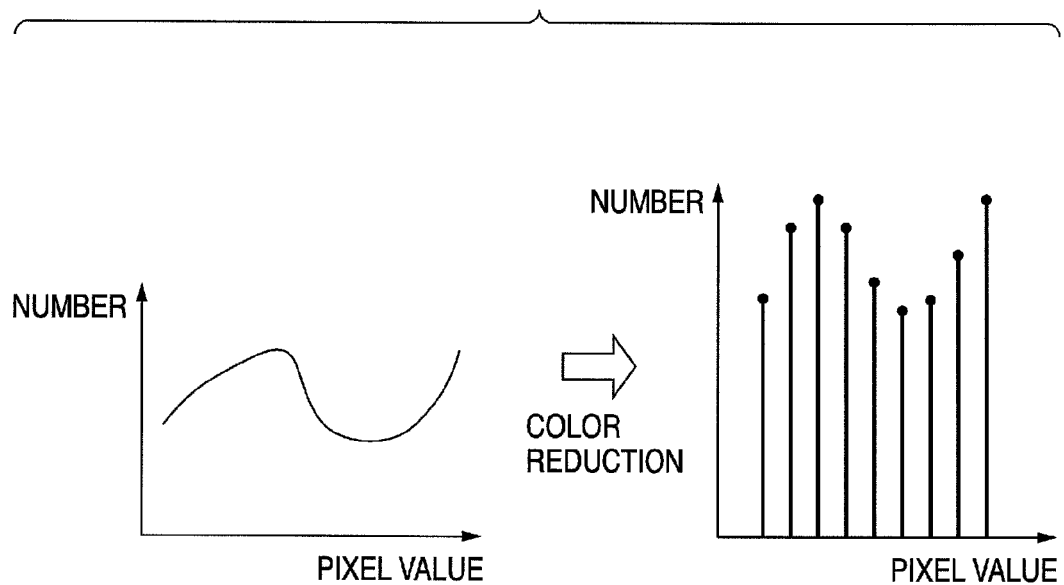
FIG. 5 describes a color reducing process.

As a method of reducing the processing load of the labeling process described above, a method of reducing the resolution of a rectangular image and a method (color reduction) of reducing the types of pixel values contained in a rectangular image as shown in FIG. 5 are possible. These two methods have their respective merits and demerits.

Figure 6:
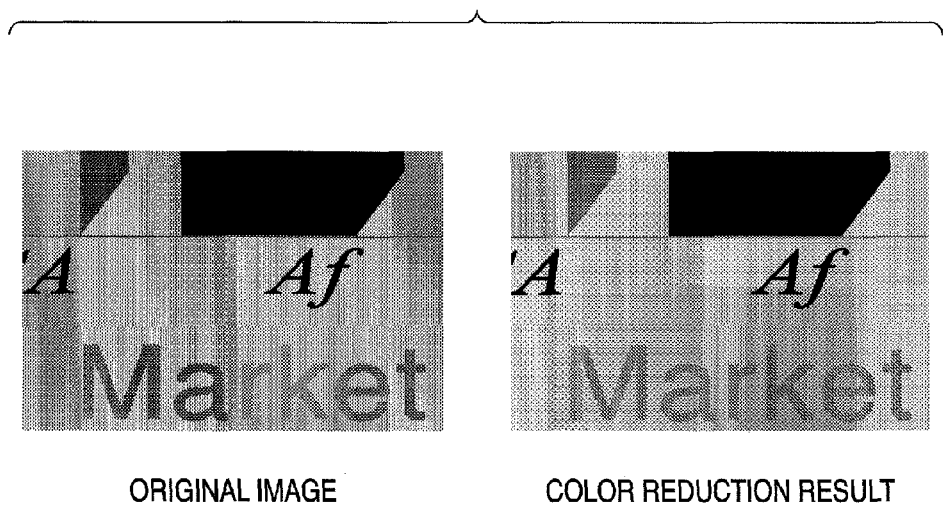
FIG. 6 describes the color reducing process.

Color reduction readily accomplishes vectorization because a general shape of an original image can be relatively maintained, as shown in FIG. 6. However, if the number of colors originally contained in a rectangular image is small, even the color reducing process cannot largely reduce the number of colors. Consequently, the execution speed of the vectorization process cannot increase.

Figure 7:
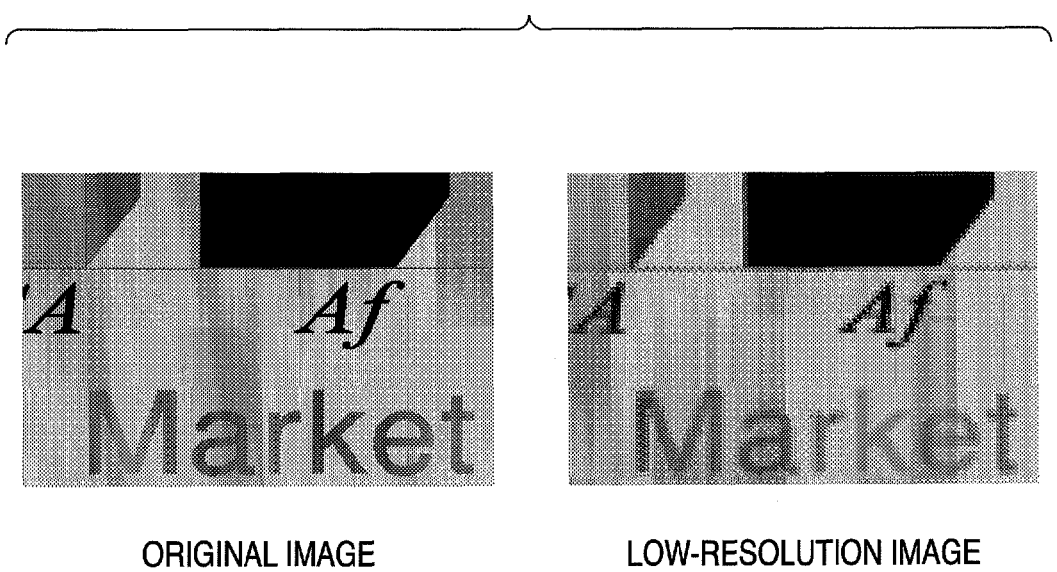
FIG. 7 is a view for explaining a resolution reducing process.

On the other hand, resolution reduction always increases the processing speed, unlike color reduction. As shown in FIG. 7, however, the edges are blurred, lowering the vectorization accuracy. Therefore, if color reduction and resolution reduction are singly used, the problems often become conspicuous. The embodiment can efficiently increase the processing speed by appropriately combining the methods.

According to the embodiment, if it is determined that the labeling process takes a time equal to or longer than a predetermined time, color reduction is performed on a rectangle to be labeled if the number of colors contained in the rectangle is large, and resolution reduction is performed if the number of colors is small, making it possible to increase the speed of the processing overall.

Figure 1:
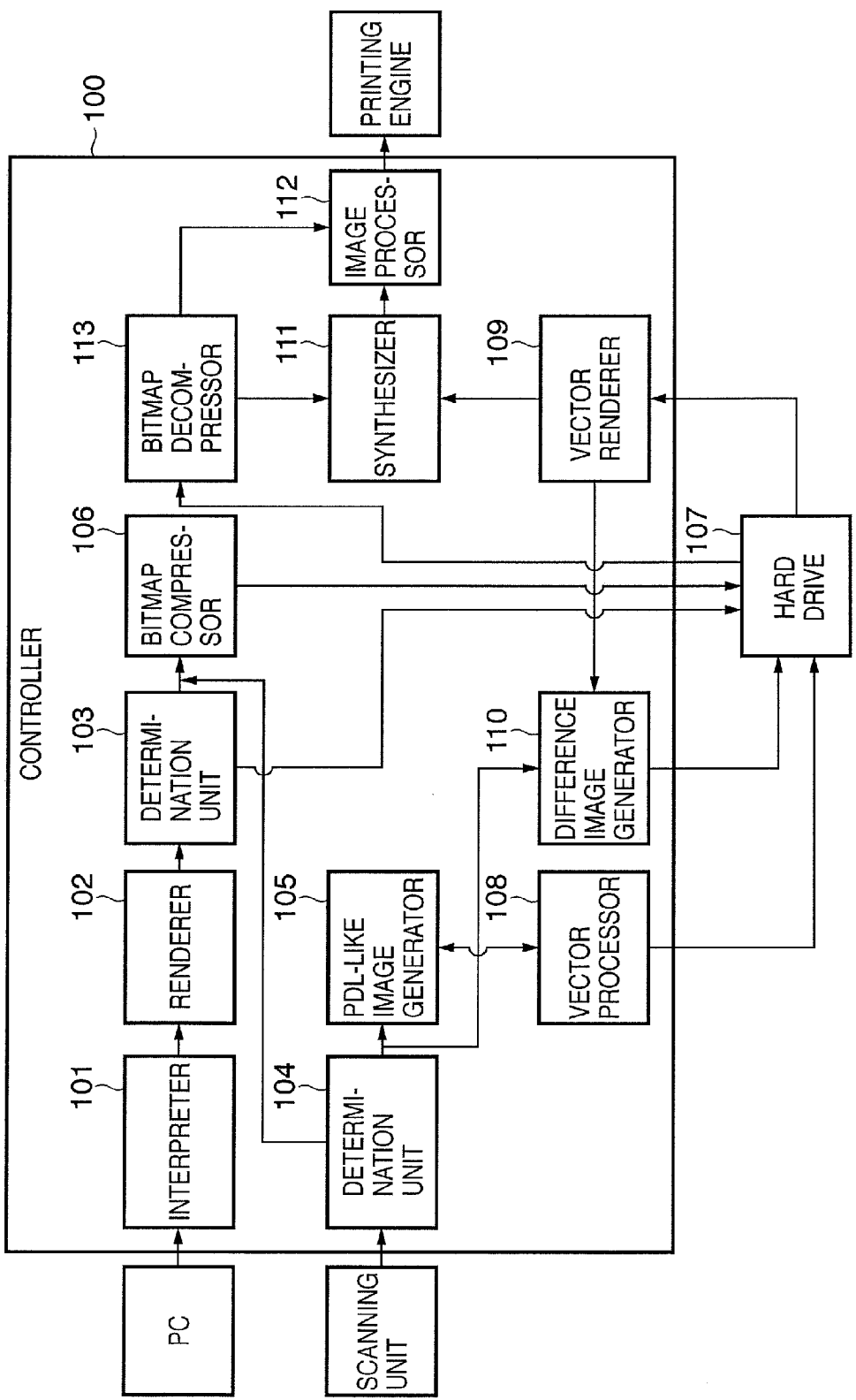
FIG. 1 is a block diagram showing the functional configuration of a controller of an image processing apparatus, e.g., a copying machine or multifunction peripheral, according to the first embodiment of the present invention

FIG. 1 is a block diagram showing the functional configuration of a controller of an image processing apparatus, e.g., a copying machine or multifunction peripheral, according to the embodiment. A controller 100 comprises an interpreter 101, a renderer 102, a determination unit 103, a bitmap compressor 106, a bitmap decompressor 113, a determination unit 104, a PDL-like image generator 105, a difference image generator 110, a vector processor 108, a vector renderer 109, a synthesizer 111, and an image processor 112. The description of the embodiment presumes that all of the units are configured in hardware. However, one or more of the units may also be configured in software.

As shown in FIG. 1, the controller 100 according to the embodiment is connected to a PC (Personal Computer), a scanning unit, a printing engine, and the hard drive 107.

The description commences with the processing that is performed by the controller 100. The controller 100 performs the processing in accordance with the flowchart shown in FIG. 12, foregoing, except for processes in several steps. Following is a description of a situation wherein the controller 100 executes the processing in accordance with the flowchart shown in FIG. 12.

Figure 12:
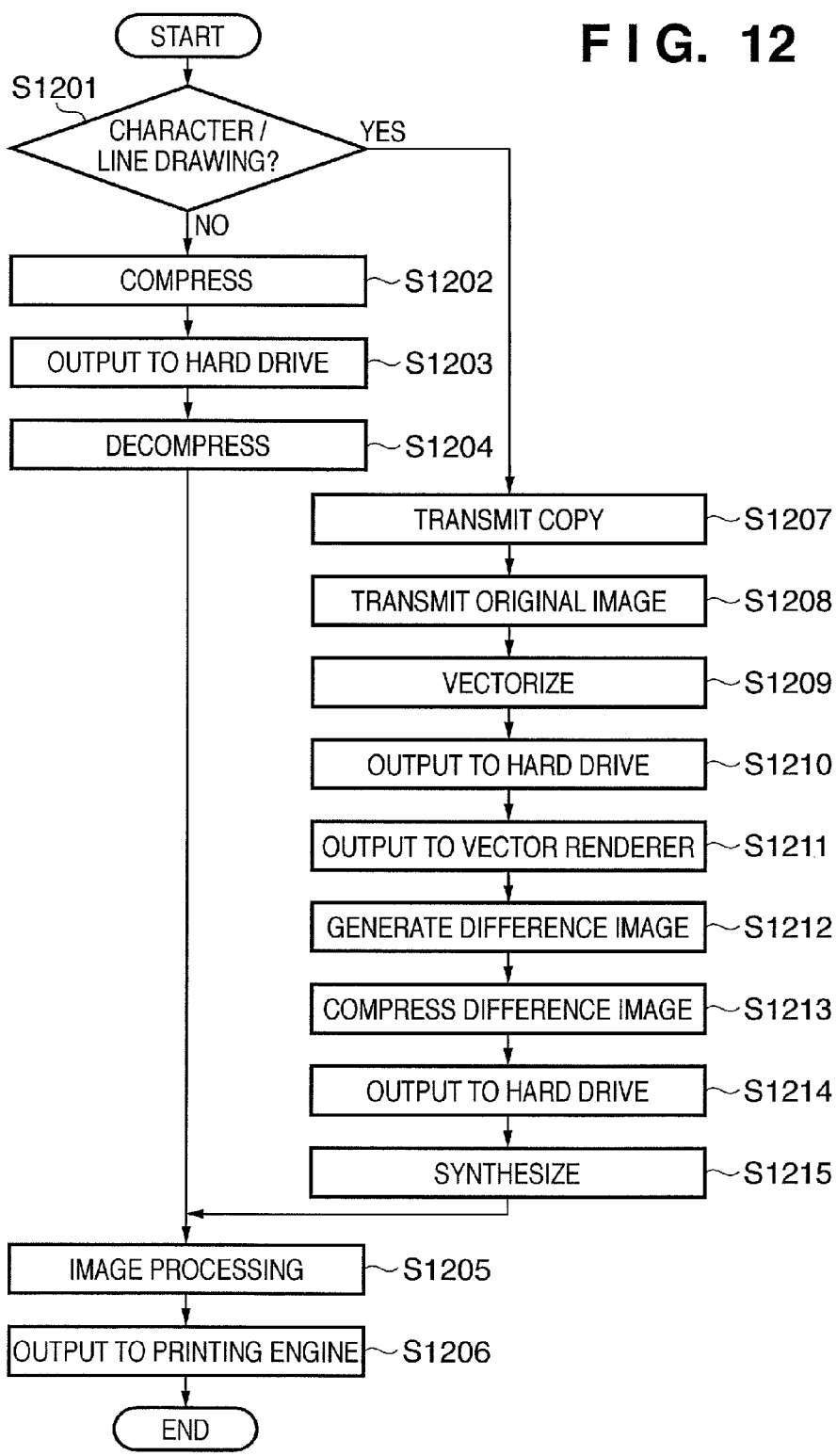
FIG. 12 is a flowchart of processing performed by the controller of the image processing apparatus.
Figure 13:
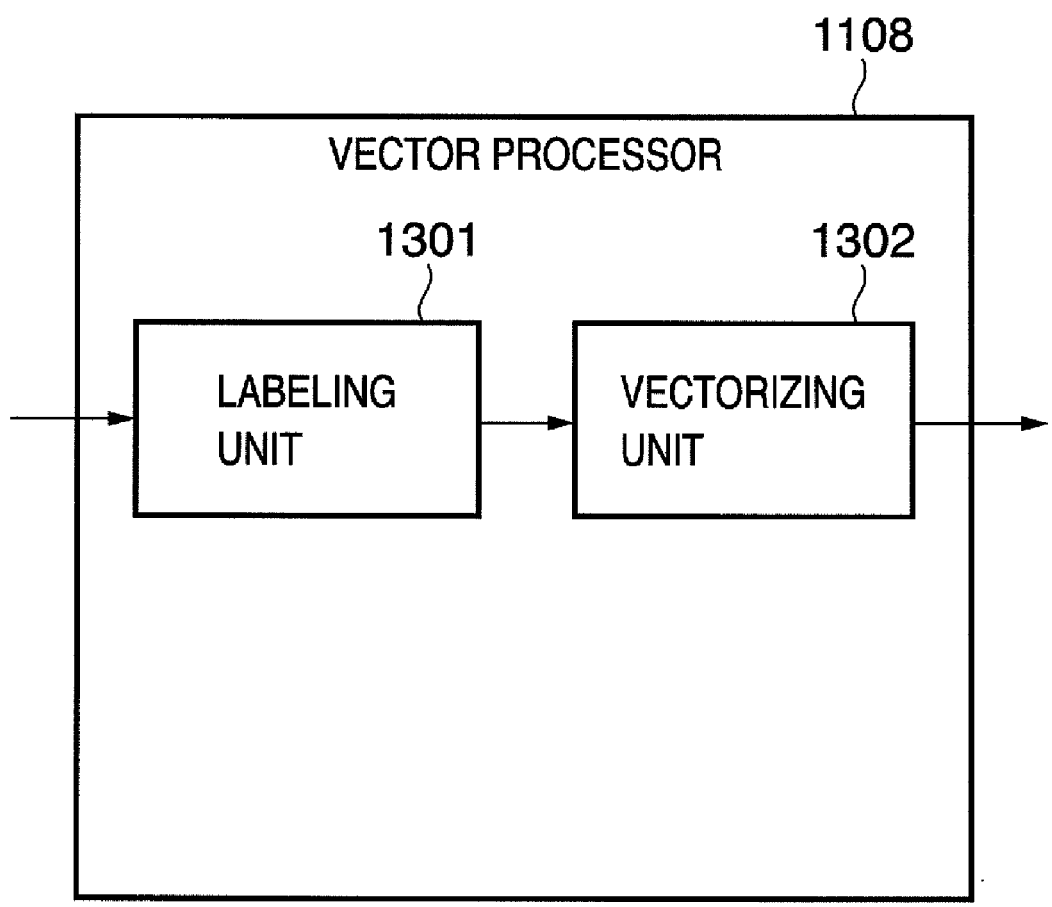
FIG. 13 is a block diagram showing an arrangement of a vector processor 1108.
Figure 14:
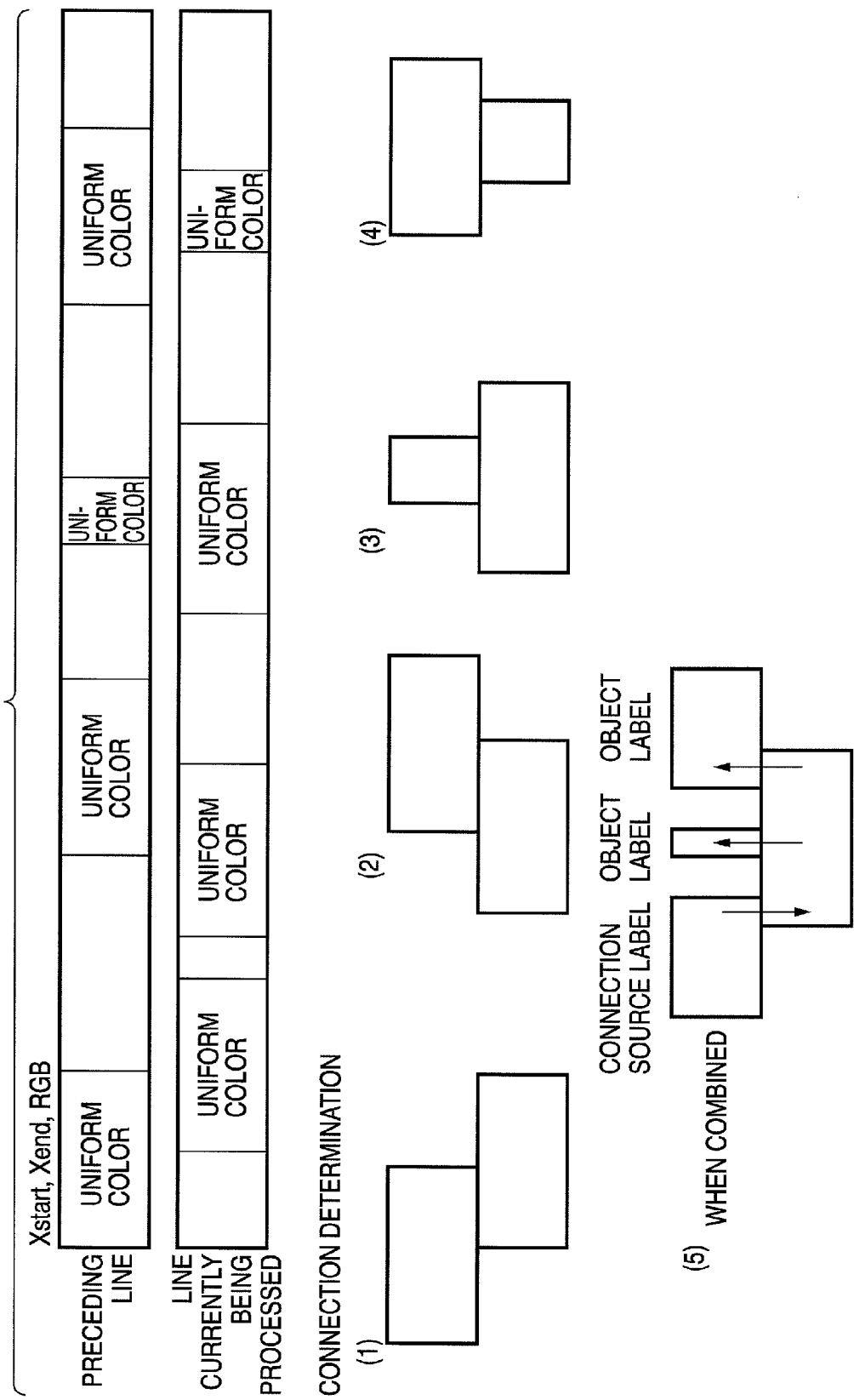
FIG. 14 describes processing performed by a labeling unit 1301.

The determination unit 104 receives output image data from the scanning unit, which is external to the system. The determination unit 1104 segments the received image into a plurality of rectangles. The image is segmented into rectangular grids having a predetermined size, according to the embodiment. The size, i.e., the threshold size, of the segmented rectangle need only match the processability of the image processing apparatus. Examples are 32×32 pixels and 64×64 pixels. Whereas an image is segmented into rectangles having a predetermined size according to the embodiment, an image may also be segmented into variable-size rectangles in accordance with the type of the image. As per the foregoing, FIG. 12 shows the flowchart of the processing performed on each segmented rectangle. Therefore, processing of a target rectangle will be described hereinafter, with other rectangles processed in a similar fashion.

In step S1201, the determination unit 104 determines whether the target rectangle is a character/line image or a natural image. If the target rectangle contains both a character/line image and a natural image, the determination unit 104 determines that the target rectangle is a natural image. The determination process is a well-known technology, and thus, a description thereof will be omitted herein.

If the determination unit 1104 determines that the target rectangle is a natural image, the process advances to step S1202, and the bitmap compressor 106 compresses the target rectangle. The possible compression methods are not particularly restricted herein. In step S1203, the bitmap compressor 106 stores the compressed target rectangle on the hard drive 107.

In step S1204, the bitmap decompressor 113 reads out the stored compressed target rectangle from the hard drive 107, and decompresses the readout rectangle in synchronism with the timing of printing performed by the printing engine, i.e., the printer. The decompressing process corresponds to the preceding compressing process.

In step S1205, the image processor 112 performs various types of image processing on the decompressed target rectangle. In step S1206, the image processor 112 outputs the processed target rectangle to the printing engine.

On the other hand, if the determination unit 104 determines in step S1201 that the target rectangle is a character/line image, the process advances to step S1207, wherein the determination unit 104 transmits a copy of the image of the target rectangle to the difference image generator 110. In step S1208, the determination unit 104 transmits the original target image to the PDL-like image generator 105, which removes the noise from the image of the received target rectangle.

In step S1209, the vector processor 108 vectorizes the image transmitted from the PDL-like image generator 105, i.e., the image is converted into vector data. In step S1210, the vector processor 108 stores the result of this vectorization process, i.e., the vector data generation process, on the hard drive 107.

Figure 2:
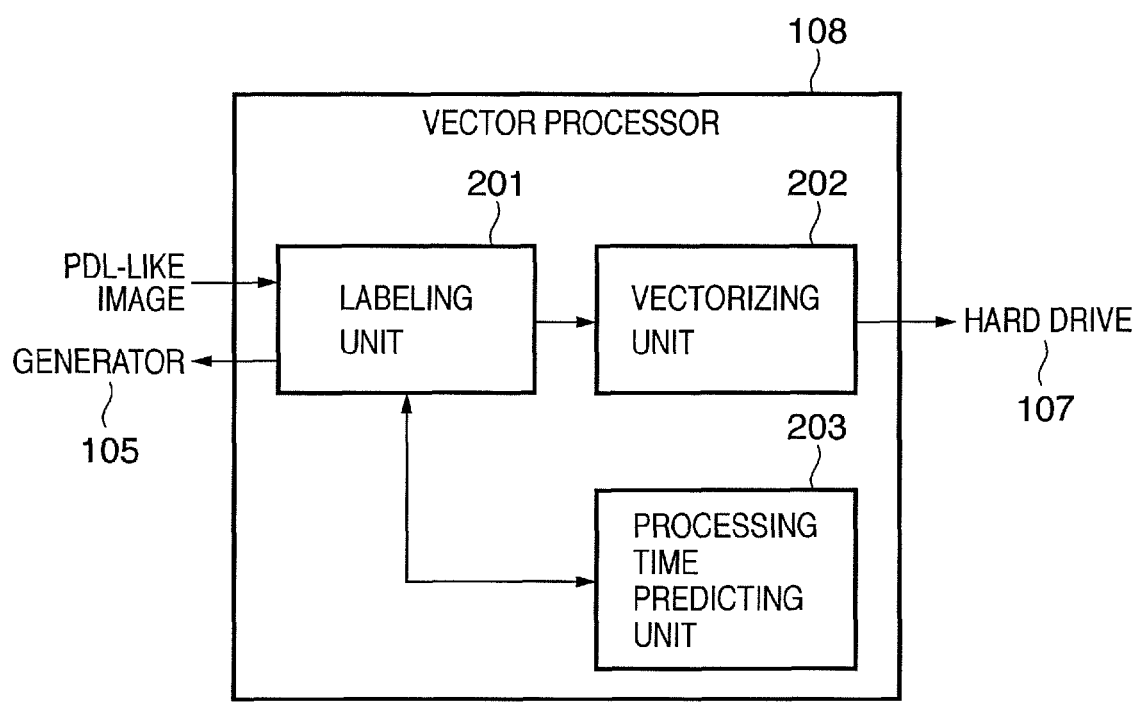
FIG. 2 is a view showing a functional configuration of a vector processor 108.

FIG. 2 is a view showing a functional configuration of the vector processor 108, according to the embodiment. As shown in FIG. 2, the vector processor 108 has a labeling unit 201, a vectorizing unit 202, and a processing time predicting unit 203.

Figure 3:
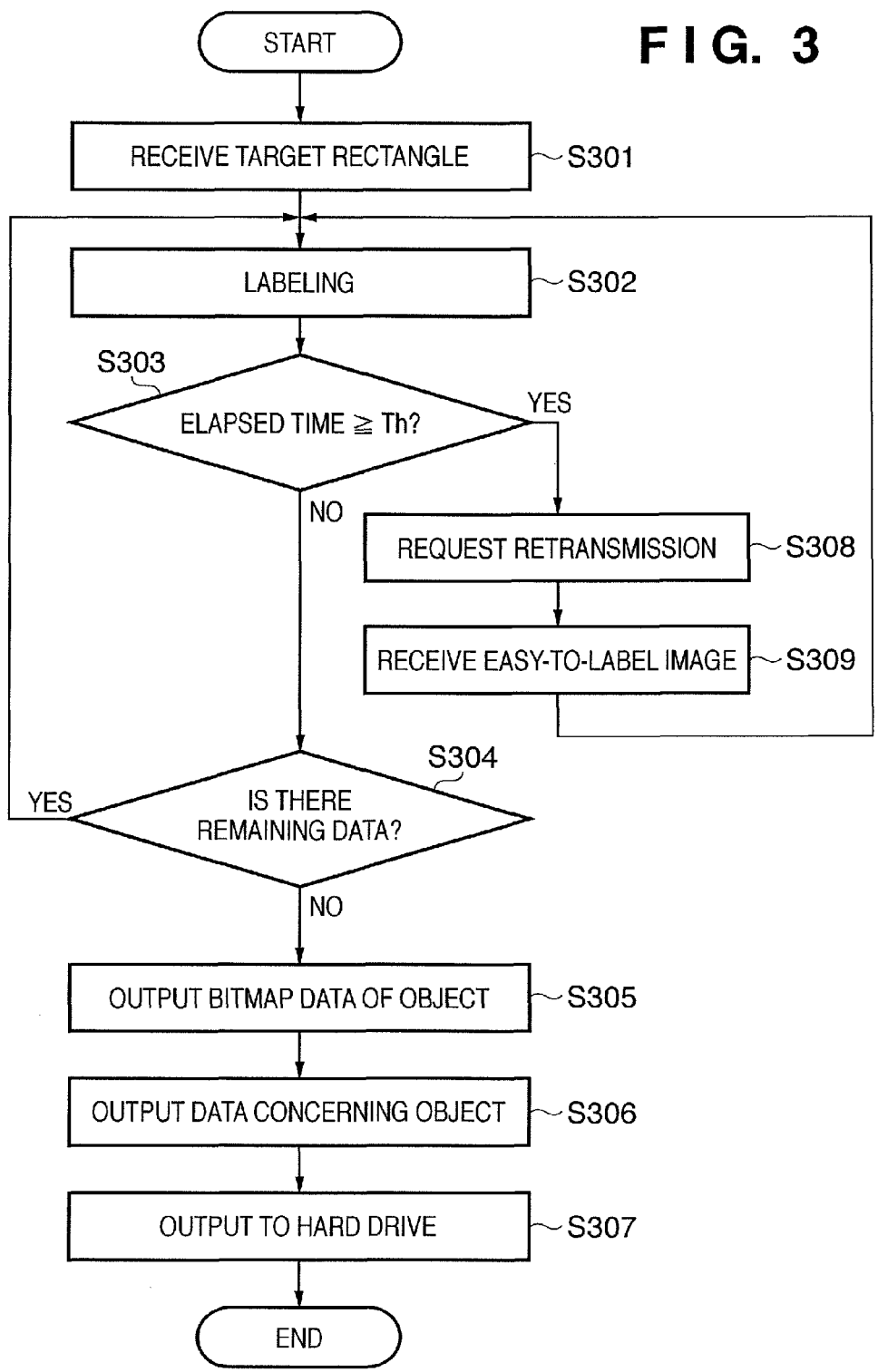
FIG. 3 is a flowchart of processing performed by the vector processor 108

FIG. 3 is a flowchart of processing performed by the vector processor 108. That is, FIG. 3 is a flowchart showing details of the processes in steps S1209 and S1210 described above.

In step S301, the labeling unit 201 receives the target rectangle from which noise is removed by the PDL-like image generator 105. In step S302, the labeling unit 201 labels each line of the target rectangle. The labeling process specifies one or more object regions contained in the target rectangle. Details of the process are the same as for the foregoing process of the labeling unit 1301. That is, the labeling unit 201 performs labeling by determining that almost equal pixel values have a uniform color, and determines the coordinates and pixel value of a uniform-color section.

In step S302, the processing time predicting unit 203 starts measuring the time at the same time the labeling unit 201 starts the labeling process on the target rectangle. That is, the processing time predicting unit 203 measures the labeling process time of the labeling unit 201.

Whenever one line of the target rectangle is labeled in step S302, a determination is made in step S303 as to whether or not the measured elapsed time has exceeded a threshold Th. If the elapsed time has not exceeded the threshold Th, a determination is made in step S304 as to whether or not there is unlabeled data in the target rectangle. If there is an unlabeled region, i.e., data, in the target rectangle, the process returns to step S302, and the labeling unit 201 labels the unlabeled region.

On the other hand, if there is no unlabeled, i.e., unexecuted, region, i.e., data) in the target rectangle, i.e., if the target rectangle is completely labeled, the process advances to step S305, wherein the labeling unit 201 generates a uniform-color region by connecting uniform-color sections contacting each other across adjacent lines, regards the uniform-color region as an object, and sends data, i.e., contour coordinate data and color data, of each object as the labeling results to the vectorizing unit 202. In step S306, the vectorizing unit 202 vectorizes the contour coordinate data of each object. In step S307, the vectorizing unit 202 stores the results on the hard drive 107.

On the other hand, if it is determined in step S303 that the time measured by the processing time predicting unit 203 has exceeded the threshold Th, the process advances to step S308, wherein the labeling unit 201 requests the PDL-like image generator 105 to retransmit an unlabeled region, i.e., data of the target rectangle. That is, the labeling unit 201 requests the PDL-like image generator 105 to retransmit, from the image in the target rectangle, an image, i.e., an easy-to-label image, that has undergone predetermined processing so as to reduce the labeling process time. In step S309, the labeling unit 201 receives data of the region as an easy-to-label image from the PDL-like image generator 105. An easy-to-label image will be described hereinafter. The process returns to step S302, and the labeling unit 201 labels the easy-to-label image.

In step S1211 of FIG. 12, the vector processor 108, i.e., the vectorizing unit 202, copies the vectorized data stored in the hard drive 107 in step S1210, and outputs the copied vectorized data to the vector renderer 109, which restores the image in the target rectangle on the basis of the vectorized data. The target rectangle restored from the vector data is called a vector restored image. The vector processor 109 sends the vector restored image to the difference image generator 110.

In step S1212, the difference image generator 110 receives the original target rectangle from the determination unit 104, and generates a difference image by calculating a difference between the image of the original target rectangle and the vector restored image. Pixels forming the difference image have difference pixel values between the pixels corresponding to the original target rectangle and the pixels corresponding to the vector restored image.

In step S1213, the bitmap compressor 106 compresses this difference image. In step S1214, the bitmap compressor 106 stores the compressed difference image on the hard drive 107.

In step S1215, the vector renderer 109 generates a vector restored image on the basis of the vectorized data that is stored on the hard drive 107 in step S1210, and sends the image to the synthesizer 111. In addition, the bitmap decompressor 113 decompresses the compressed difference image that is stored on the hard drive 107 in step S1214. The synthesizer 111 synthesizes the decompressed difference image and the vector restored image restored by the vector renderer 109 to form a printout bitmap, which it sends to the image processor 112. Image synthesis is performed by adding the pixel values of pixels in the corresponding positions of the images to be synthesized.

In step S1205, the image processor 112 performs various types of image processing on the printout bitmap, i.e., an image to be printed. In step S1206, the image processor 112 outputs the processed printout bitmap to the printing engine where the image is printed out, i.e., a printing process is performed.

Whereas the foregoing flowchart is an example of printing out the vectorized data, the vectorized data can be used in another application, in addition to printing out. For example, it is also possible to transmit the vectorized data that is stored on the hard drive 107 to the PC, and reuse the vectorized data on the PC. The vectorized data stored on the hard drive 107 can be reproduced as a smooth image, even if it is enlarged or reduced. Accordingly, the vectorized data is also suited to reuse applications such as editing. Furthermore, when the vectorized data is used in printing, an image can be reproduced and printed with smooth curves that have no jaggies.

Figure 4:
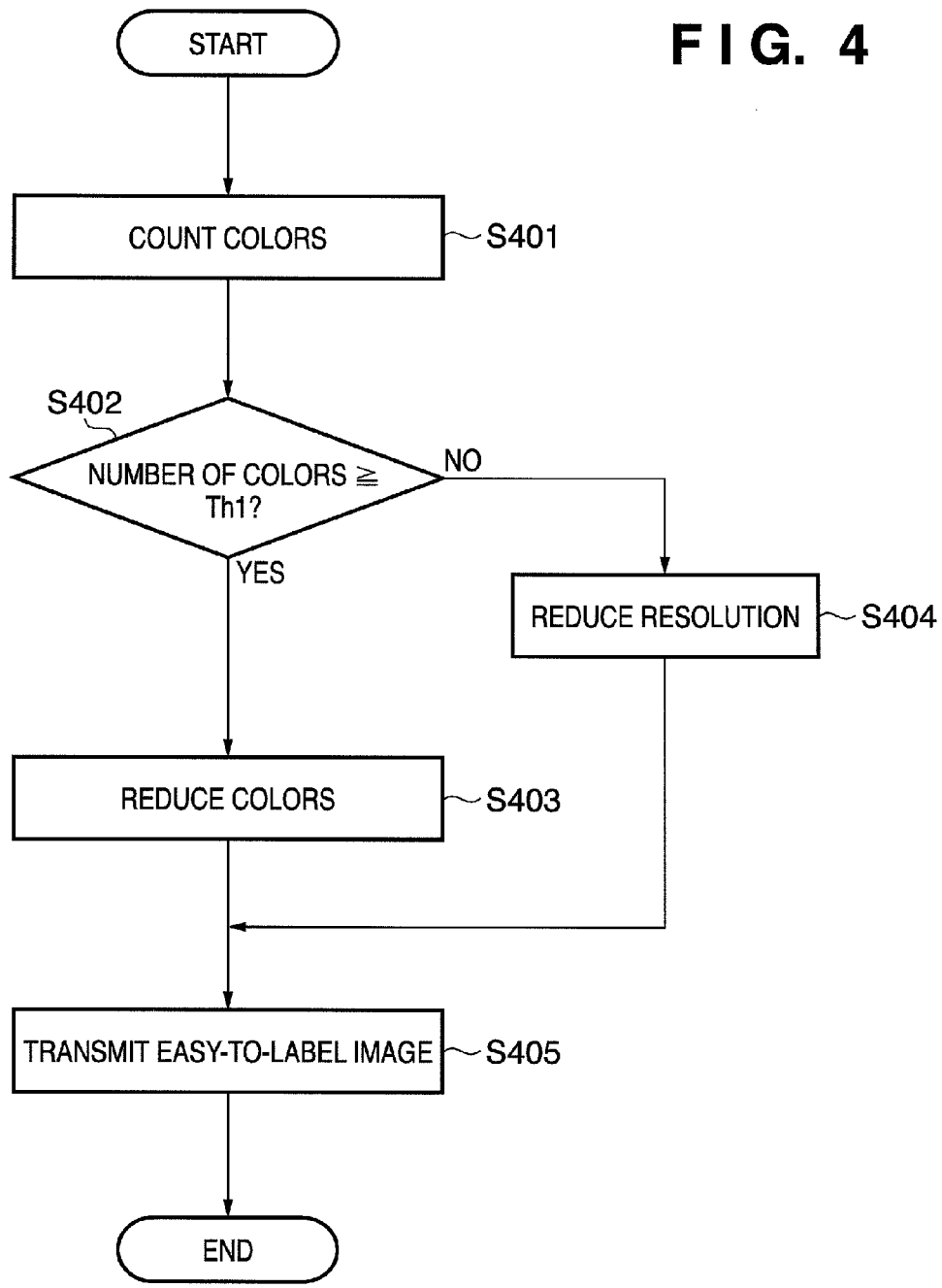
FIG. 4 is a flowchart of processing by which a PDL-like image generator 105 receives an easy-to-label image generation request, generates an easy-to-label image in response to the request, and returns the image to a labeling unit 201 as a source of the request.

Following is a description of the aforementioned easy-to-label image. The PDL-like image generator 105 generates the easy-to-label image and sends it to the labeling unit 201. The easy-to-label image has undergone the following processing in order to reduce the labeling process time. FIG. 4 is a flowchart of processing by which the PDL-like image generator 105 receives an easy-to-label image generation request, generates an easy-to-label image in response to this request, and transmits the image to the labeling unit 201 as the source of the request.

When receiving an easy-to-label image generation request from the labeling unit 201, the PDL-like image generator 105 performs processing in step S401. In step S401, the PDL-like image generator 105 counts colors contained in an unlabeled region, i.e., an unprocessed region, of the target rectangle, i.e., an analyzing process. If the PDL-like image generator 105 determines in step S402 that the number of colors, i.e., the count has exceeded a threshold Th1, the process advances to step S403, wherein the PDL-like image generator 105 performs a color reducing process on the unprocessed region in accordance with, e.g., equation (1) below, thereby generating an easy-to-label image:

$$Q(Xi)=q*\text{floor}\{(Xi/q)\} \qquad (1)$$

wherein Xi is the ith pixel value in the unprocessed region; q is an integer, e.g., when the pixel value is one of 0 to 255, i.e., a maximum number of colors is 256, the number of colors is reduced to a maximum of 32 by setting q=8; and Q(Xi) is a pixel value after color reduction.

It is of course also possible to use another method as the method of color reduction.

On the other hand, if the PDL-like image generator 105 determines in step S402 that the number of colors has not exceeded the threshold Th1, the process advances to step S404, and the PDL-like image generator 105 performs a resolution reducing process on the unprocessed region. For example, the PDL-like image generator 105 samples alternate pixels in both the vertical and horizontal directions of the unprocessed region, thereby generating an image, i.e., a simple thinned image, as an easy-to-label image. Note that the low-resolution image may also be generated by using another method.

In step S405, the PDL-like image generator 105 sends the easy-to-label image generated in step S403 or S404 to the labeling unit 201.

As per the foregoing, the embodiment switches color reduction and resolution reduction on the basis of the number of colors when generating an easy-to-label image, facilitating an efficient increase in the speed of the labeling process.

Second Embodiment

Figure 8:
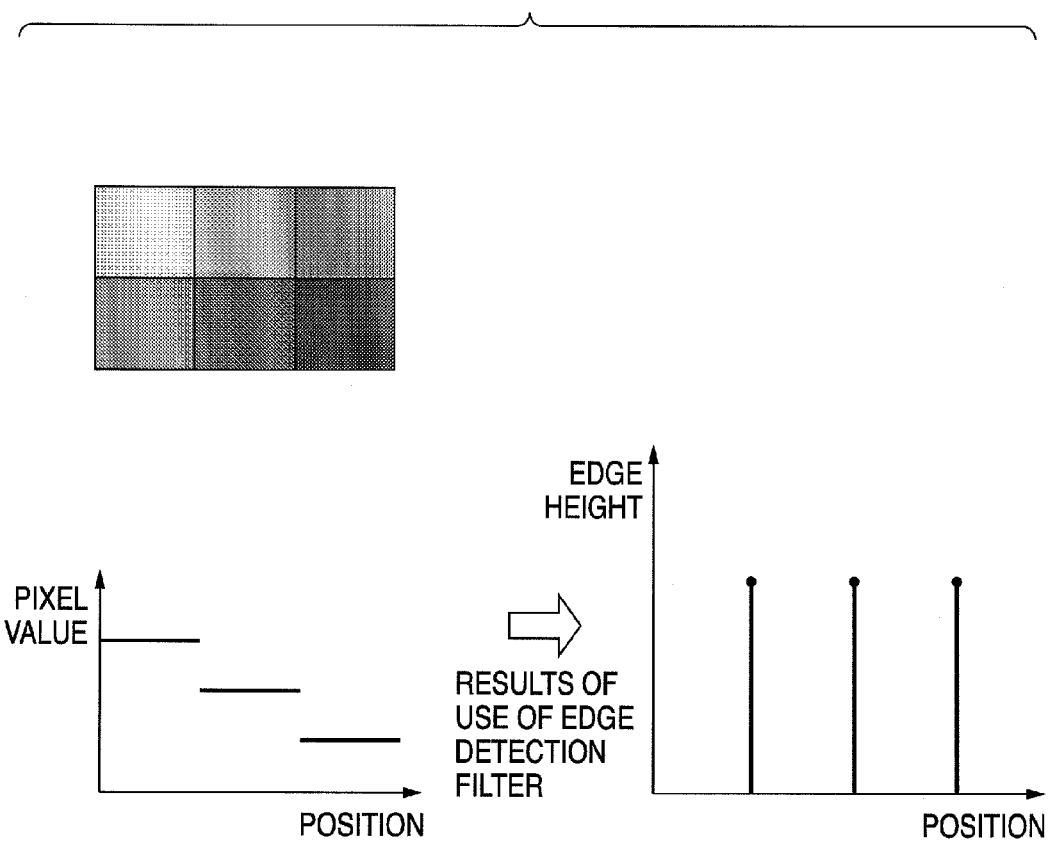
FIG. 8 describes a CG image.

The first embodiment counts colors in an unprocessed region, and performs color reduction or resolution reduction on the unprocessed region in accordance with the count. The second embodiment adopts the following method as the method of counting colors. For example, when an image is a CG image as shown in FIG. 8, edges having sizes equal to or larger than a predetermined size are detected and counted, and the count is directly regarded as the number of colors. That is, the second embodiment performs determination on the basis of the number of edges instead of the number of colors.

Figure 9:
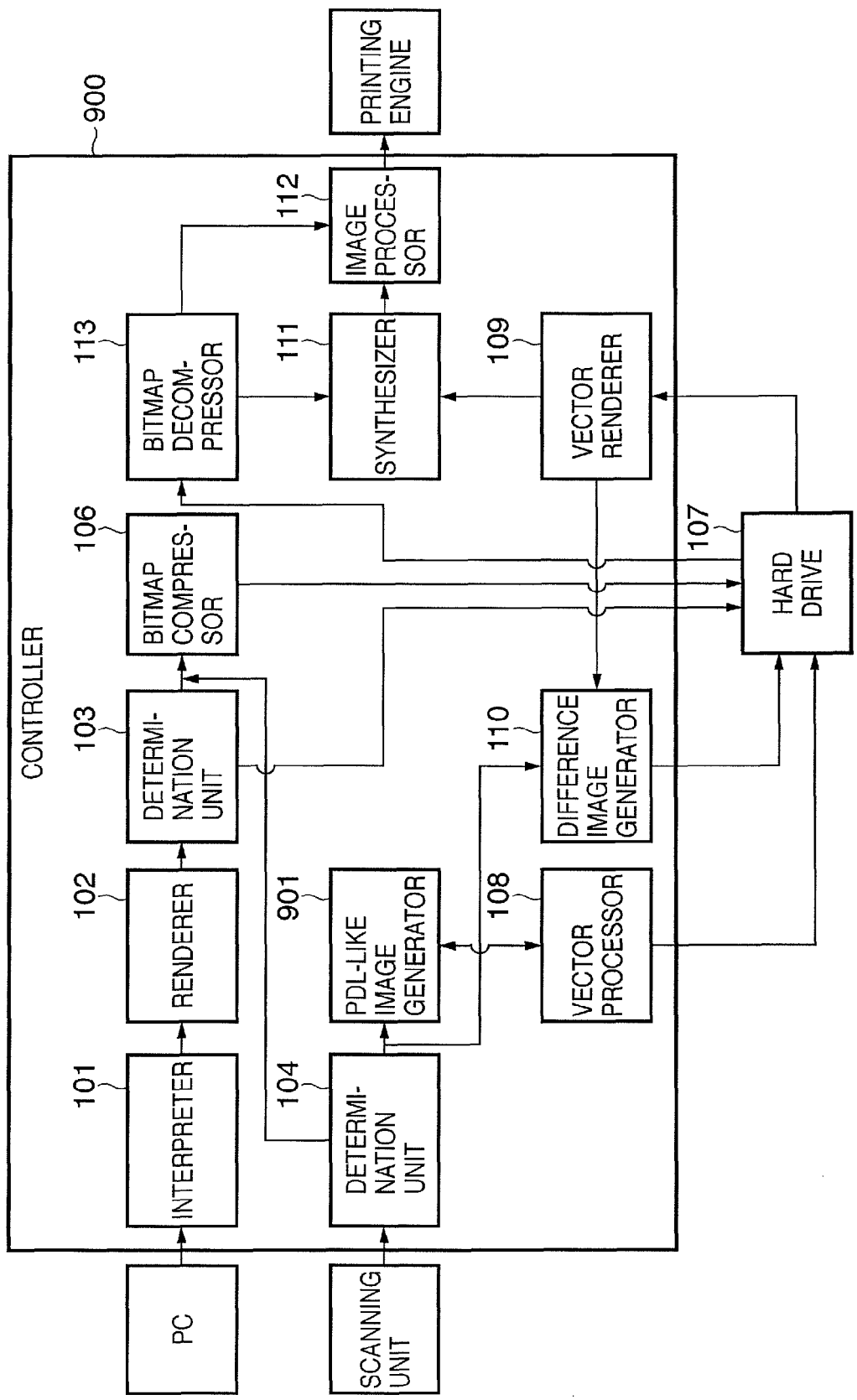
FIG. 9 is a block diagram showing a functional configuration of a controller 900 of an image processing apparatus according to a second embodiment of the present invention.

FIG. 9 is a block diagram showing a functional configuration of a controller 900 of an image processing apparatus according to the embodiment. The controller 900 shown in FIG. 9 differs from the controller 100 shown in FIG. 1 in that a PDL-like image generator 901 replaces the PDL-like image generator 105. That is, the controller 900 performs the same processing according to the first embodiment, except for the operation of the PDL-like image generator 901.

Figure 10:
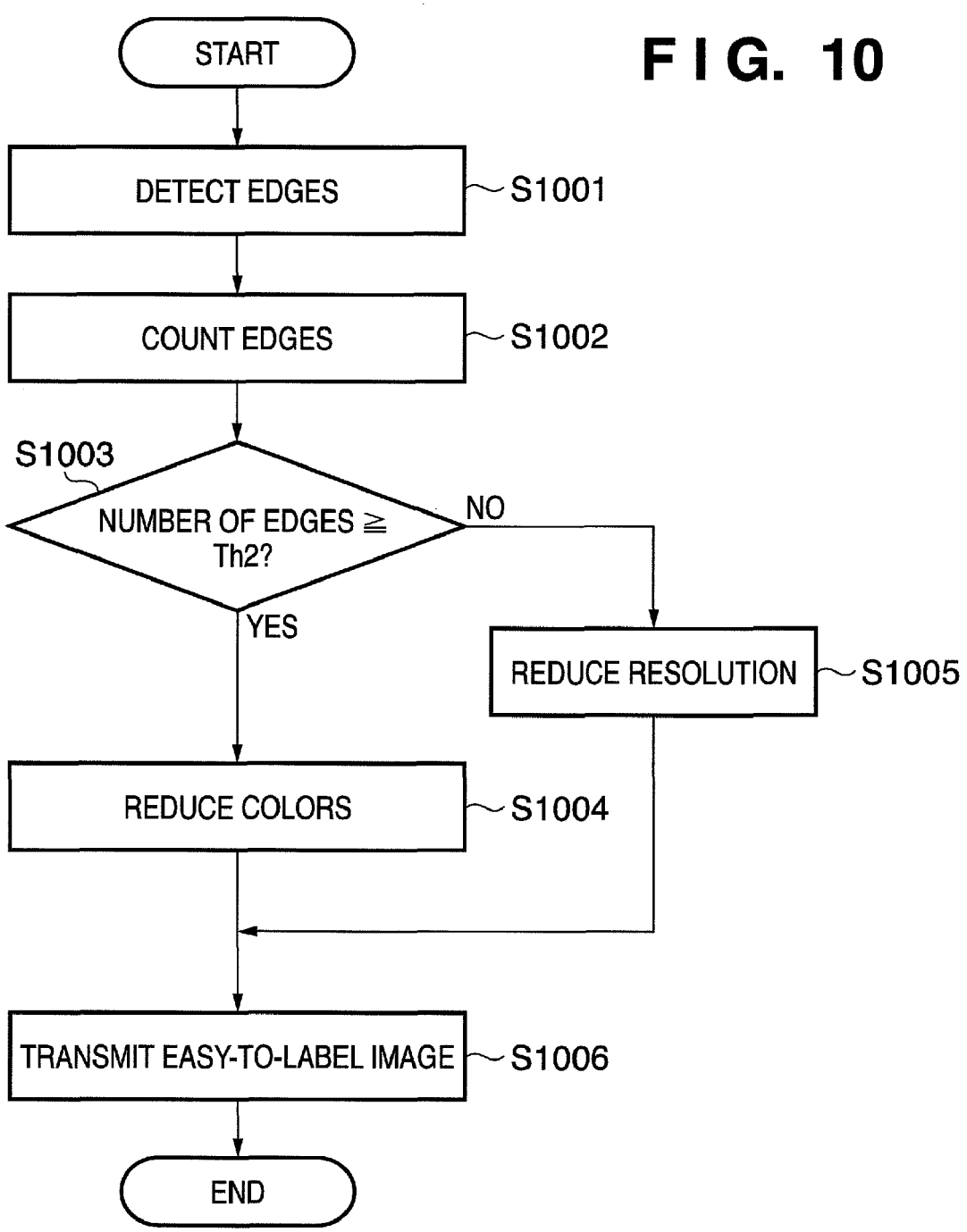
FIG. 10 is a flowchart of processing performed by an PDL-like image generator 901.
Figure 11:
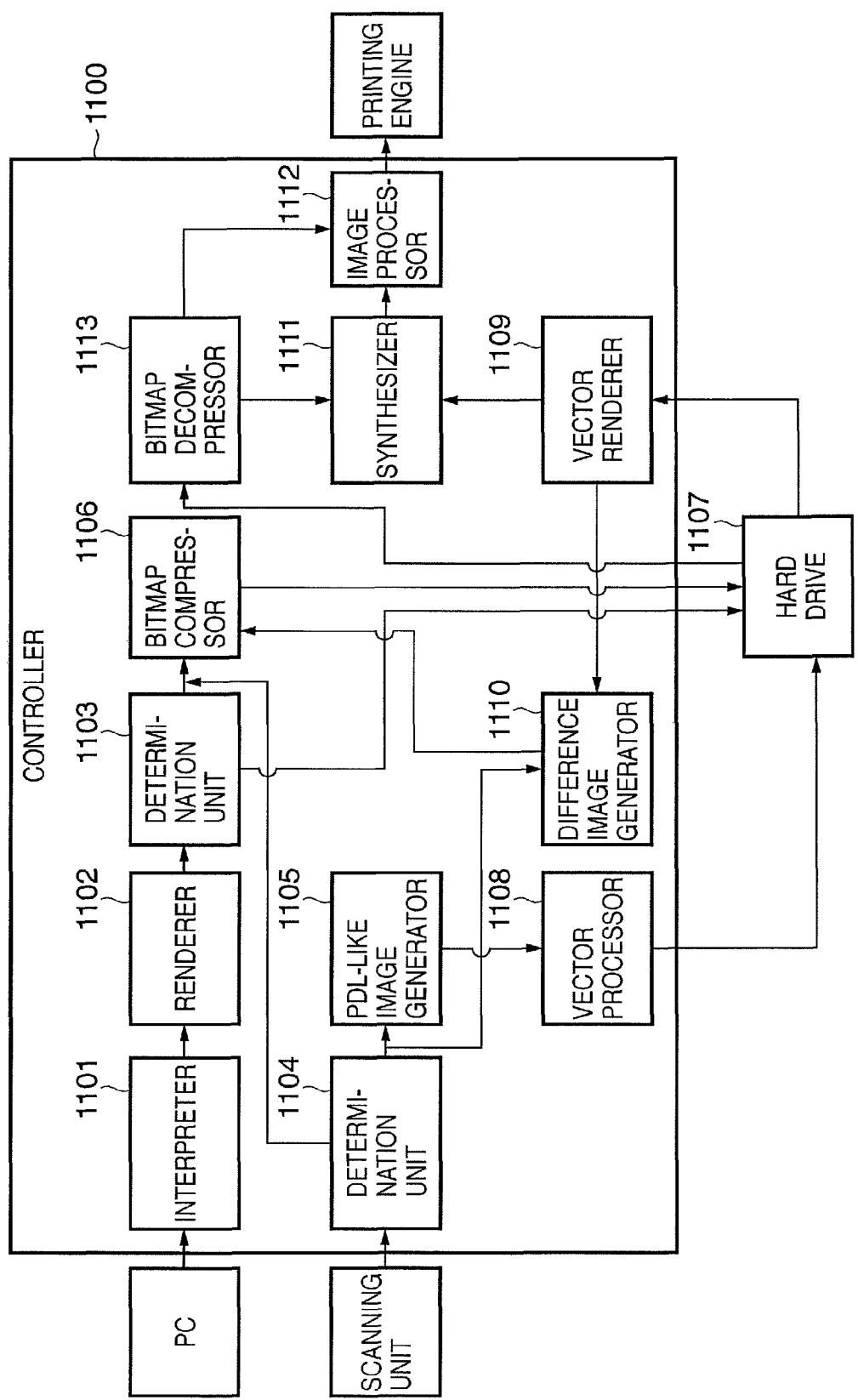
FIG. 11 is a block diagram showing a functional configuration of a controller of a conventionally proposed image processing apparatus, e.g., a copying machine or multifunction peripheral.

FIG. 10 is a flowchart of a process performed by the PDL-like image generator 901.

In step S1001, when receiving an easy-to-label image generation request from a labeling unit 201, the PDL-like image generator 901 refers to an unlabeled region, i.e., an unprocessed region, in a target rectangle, and detects edges having edge intensity equal to or larger than a predetermined value. An edge detection filter, such as a Sobel filter, is used in the edge detection. In step S1002, the PDL-like image generator 901 counts the detected edges.

If the count, i.e., the number of edges having edge intensity equal to or larger than the predetermined value in the unprocessed region, has exceeded a threshold Th2, the process advances to step S1004, wherein the PDL-like image generator 901 performs a color reducing process on the unprocessed region to generate an easy-to-label image, in the same manner as in step S403.

On the other hand, if the count has not exceeded the threshold Th2, the process advances to step S1005 via step S1003.

In step S1005, the PDL-like image generator 901 performs a resolution reducing process on the unprocessed region, in the same manner as in step S404.

In step S1006, the PDL-like image generator 901 sends the easy-to-label image generated in step S1004 or S1005 to the labeling unit 201.

As per the foregoing, the embodiment switches color reduction and resolution reduction on the basis of the number of edges when generating an easy-to-label image, facilitating an efficient increase in the speed of the labeling process.

Third Embodiment

Instead of measuring the elapsed time of the labeling process time to predict the end time of the whole labeling process, according to steps S302 and S303 of the first embodiment, it is also possible to predict the labeling process time from the characteristic, e.g., the number of edges of an image, and determine, on the basis of the predicted time, whether to use an easy-to-label image.

As described above, a variety of characteristics can be used as an index for determining whether to use an easy-to-label image, and an index for determining whether to perform a color reducing process or a resolution reducing process. It is also possible to use a variety of values as thresholds for use in the process.

Furthermore, to implement the processors configuring the controller shown in FIG. 1 or 9 by programs, a CPU and memory are installed in the controller, and programs for allowing a computer to function as the individual processors are stored in the memory. Note that the memory storing the programs need only be a computer-readable storage medium. The computer (CPU) functions as the individual processors by executing the programs. In such a circumstance, the programs allow the CPU to execute the processes corresponding to the flowcharts shown in FIGS. 3, 4, 10, and 12. When executing the processes, the memory is used to temporarily store data.

Fourth Embodiment

The first through the third embodiments have explained the system that retransmits a reduced image or an image having undergone color reduction from the viewpoint of the processing speed. The fourth embodiment describes a system that retransmits an image from the viewpoint of the code amount of a vectorized object.

Figure 15:
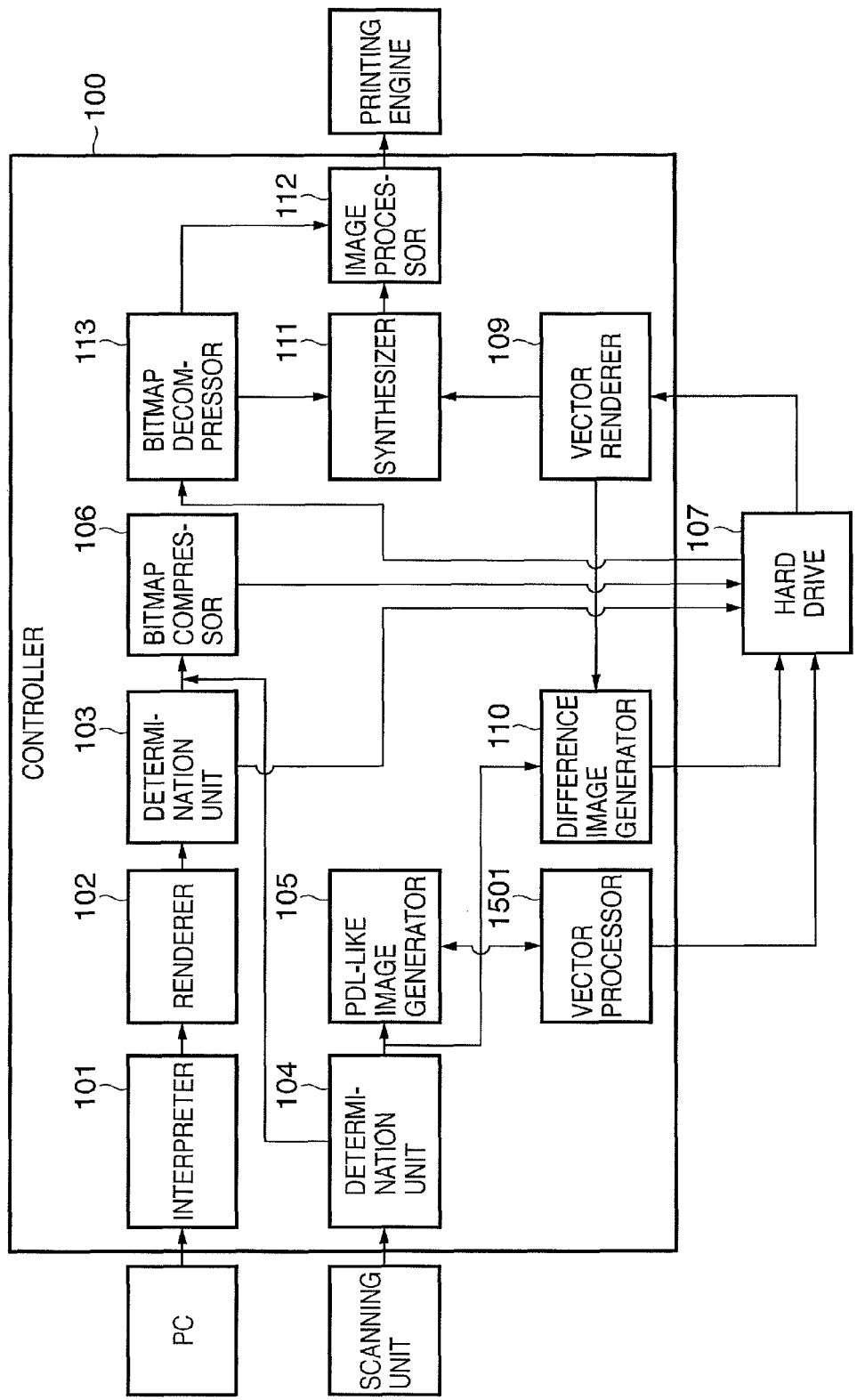
FIG. 15 is a block diagram showing a functional configuration of a controller of an image processing apparatus according to a fourth embodiment of the present invention.

FIG. 15 is a block diagram showing a functional configuration of a controller of an image processing apparatus according to the embodiment. The same reference numerals as in FIG. 1 denote the same parts in FIG. 15, and a repetitive description thereof will be omitted. The configuration shown in FIG. 15 is obtained by replacing the vector processor 108 shown in FIG. 1 with a vector processor 1501, described hereinafter.

Figure 16:
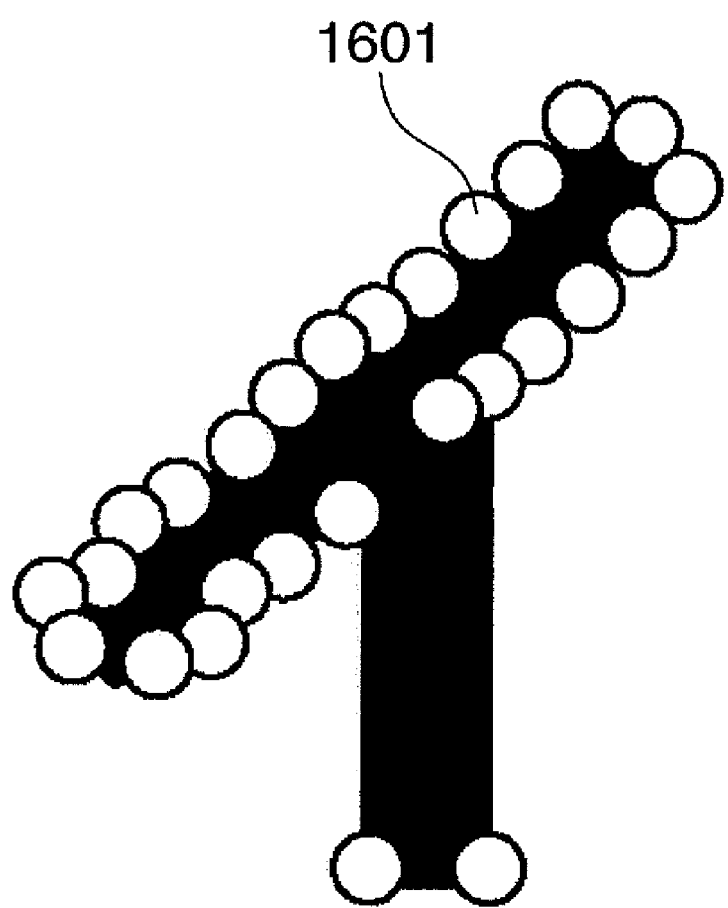
FIG. 16 is a view showing an example of an object having a plurality of anchor points.

When receiving a rectangle containing an object, i.e., a character/line drawing or clip art, that is a character, clip art, or line drawing, to be vectorized, the vector processor 1501 vectorizes the object in the received rectangle. If the vector processor 1501 determines during the vectorization process that the number of anchor points, i.e., circles denoted by 1601 in FIG. 16, is large, as shown in FIG. 16, i.e., if the calculated code amount is larger than a given threshold, the vector processor 1501 outputs an easy-to-vectorize image retransmission request to a PDL-like image generator 105. FIG. 16 is a view showing an example of an object having a plurality of anchor points.

Upon receiving the retransmission request, the PDL-like image generator 105 retransmits a low-resolution image obtained by reducing the number of pixels of the corresponding rectangle to half in both the vertical and horizontal directions. The vector processor 1501 vectorizes the retransmitted low-resolution image. Note that the vectorization anchor points are counted in the vectorization process for the easy-to-vectorize image as well. If the count is found to be larger than a preset number, the vector processor 1501 outputs a request for retransmission of an image that is easier to vectorize, and repeats the same processing. The vector processor 1501 is thus controlled to perform the same processing once more.

Note that it is also possible to use the processing time of the vector processor 1501, i.e., labeling and vectorization, together with the volume of code, i.e., the volume related to the vector processor, as a criterion for determining whether to output a retransmission request. That is, if the time, i.e., the processing time that the vector processor 1501 requires to process one rectangle has exceeded a given threshold, the vector processor 1501 outputs the retransmission request to the PDL-like image generator 105.

Fifth Embodiment

The fourth embodiment outputs a retransmission request if the number of anchor points is larger than a preset number. Therefore, deterioration of characters for which the quality is important may become conspicuous in some cases. The fifth embodiment directly outputs a character region in the form of a bitmap without outputting any retransmission request.

Figure 17:
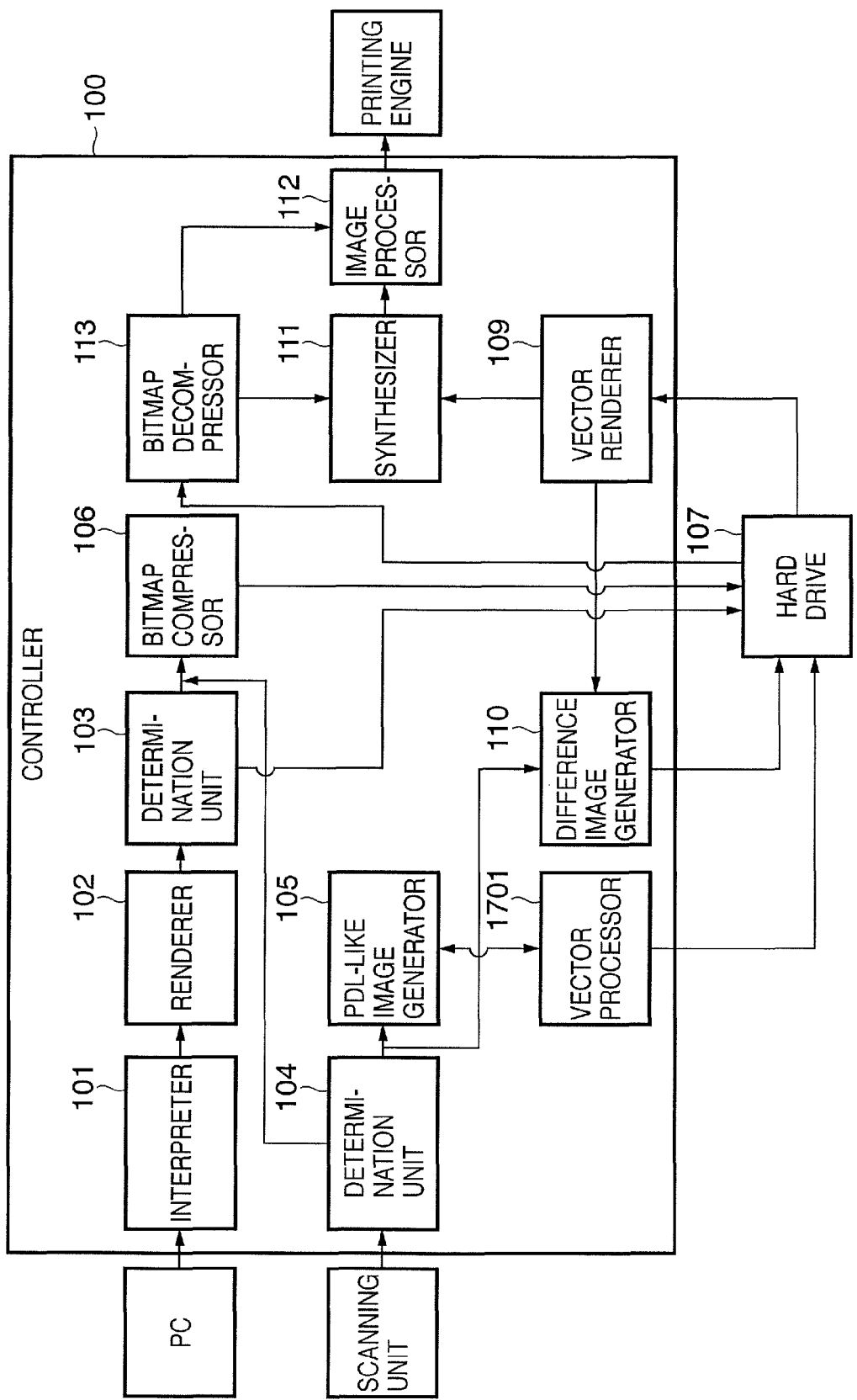
FIG. 17 is a block diagram showing a functional configuration of a controller of an image processing apparatus according to a fifth embodiment of the present invention.

FIG. 17 is a block diagram showing a functional configuration of a controller of an image processing apparatus according to this embodiment. Note that the same reference numerals as in FIG. 1 denote the same parts in FIG. 17, and a repetitive description thereof will be omitted. The configuration shown in FIG. 17 is obtained by replacing the vector processor 108 shown in FIG. 1 with a vector processor 1701, described hereinafter.

When receiving a character to be vectorized, the vector processor 1701 determines whether the volume of code of the received character is large, in the same manner as according to the fourth embodiment. If the vector processor 1701 determines that the volume of code is large, e.g., the volume of code is larger than a preset volume of code) during a vectorization process, the vector processor 1701 directly outputs bitmap data to be vectorized.

Sixth Embodiment

Clip art having many colors produces many regions after clustering, often increasing the amount of vector data. A color reducing process functions to reduce color regions, thus decreasing the number of regions. As a consequence, a reduction can be expected in the volume of code after vectorization. The embodiment describes a system that requests a retransmission of a color-reduced image if the volume of code of clip art increases.

Figure 18:
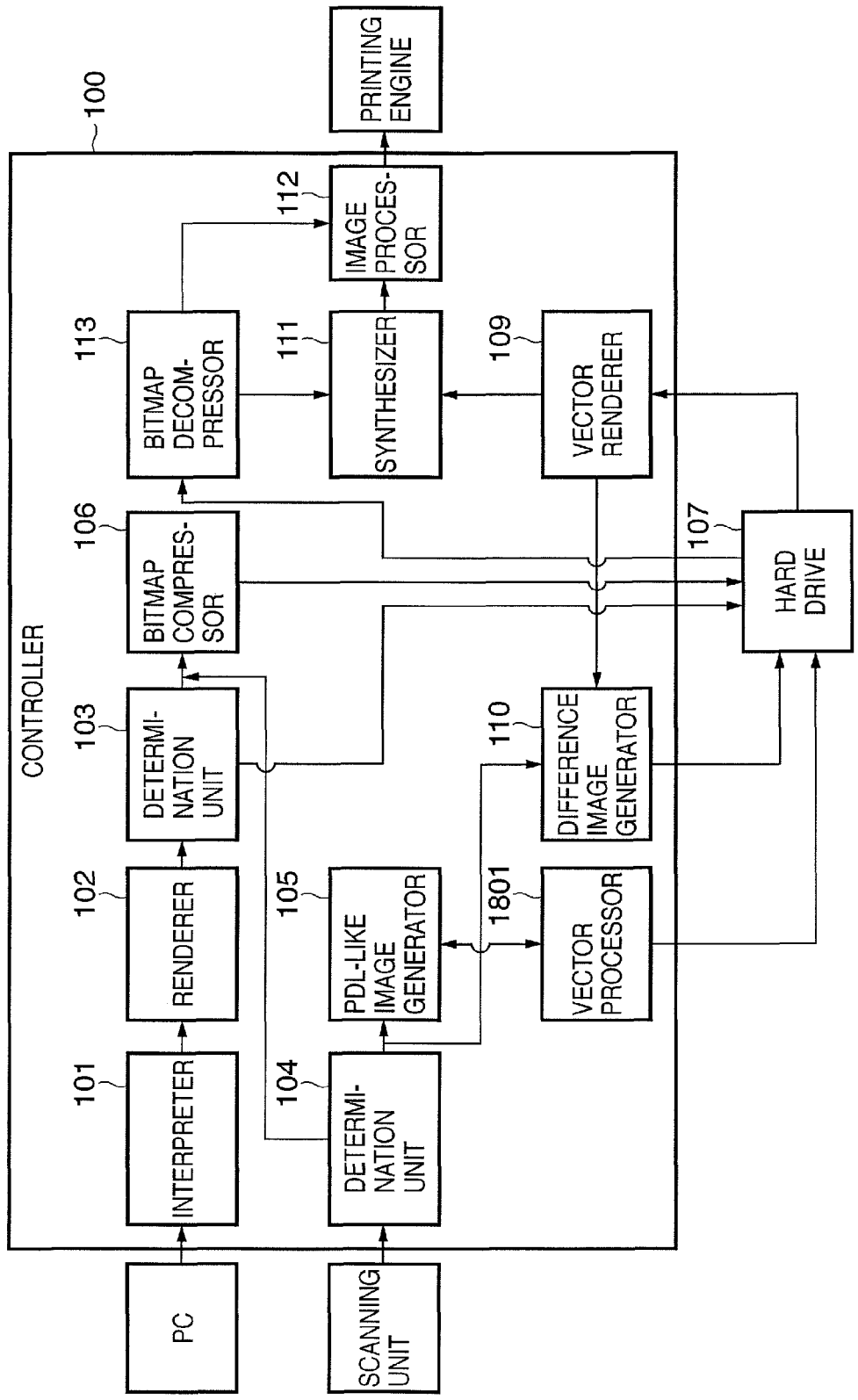
FIG. 18 is a block diagram showing a functional configuration of a controller of an image processing apparatus according to a sixth embodiment of the present invention.

FIG. 18 is a block diagram showing a functional configuration of a controller of an image processing apparatus according to the embodiment. Note that the same reference numerals as in FIG. 1 denote the same parts in FIG. 18, and a repetitive description thereof will be omitted. The configuration shown in FIG. 18 is obtained by replacing the vector processor 108 shown in FIG. 1 with a vector processor 1801, described hereinafter.

Upon receiving clip art, the vector processor 1801 vectorizes the clip art. If the volume of code is smaller than a preset amount, the vector processor 1801 directly outputs the vectorized data. If the volume of code is larger than the preset amount, the vector processor 1801 outputs a retransmission request to a PDL-like image generator 105.

The PDL-like image generator 105 performs color reduction and retransmits the data. The vector processor 1801 vectorizes the data. The vector processor 1801 outputs the result if the code amount is small, and outputs a retransmission request again if the code amount is large, thereby repeating the same operation.

It is presumed that, in each embodiment following the fourth embodiment, the retransmission request is outputted while the vector processor is processing a target rectangle. In such a circumstance, the vector processor vectorizes a rectangle that is obtained again in response to the retransmission request, regardless of the degree to which the vector processor has processed the target rectangle. However, it is also possible to vectorize a rectangle obtained again in response to a retransmission request for only a portion that the vector processor has not yet processed when it has output the retransmission request, i.e., when it has determined that a need to output the retransmission request exists.

Other Embodiments

It is of course also possible to achieve the object of the present invention as follows. A recording medium, or a storage medium, recording a program code, i.e., computer program, of software that implements the functions of the embodiments is supplied to a system or apparatus. A computer, or a CPU or MPU, of the system or apparatus reads out the program code stored in the recording medium, and executes the program code that is read out therefrom. In such a circumstance, the program code that is itself read out from the recording medium implements the functions of the embodiments, and the recording medium, i.e., a computer-readable recording medium that stores the program code constitutes the present invention.

Also, the present invention naturally includes the case that the computer executes the readout program code, and an operating system (OS) or the like running on the computer performs actual processing, in whole or in part, on the basis of instructions by the program code, thereby implementing the functions of the embodiments described above.

It is further presumed that the program code read out from the recording medium is written in a memory of a function expansion card inserted into the computer or in a memory of a function expansion unit connected to the computer. The present invention of course includes the case that a CPU or the like of the function expansion card or function expansion unit performs the actual processing, in whole or in part, on the basis of instructions by the program code thereafter, thereby implementing the functions of the embodiments.

When the present invention is applied to the recording medium, the recording medium stores a program code corresponding to the foregoing flowcharts.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalent structures and functions.

This application claims the benefit of Japanese Patent Application No. 2006-162808, filed Jun. 12, 2006 and 2007-

106366, filed Apr. 13, 2007, which are hereby incorporated by reference herein in their entireties.

What is claimed is:

1. An image processing apparatus, comprising:
at least one processor operable to function as:
a labeling unit adapted to execute a labeling process for specifying at least one object region contained in a received image; and
a vectorizing unit adapted to generate vector data on the basis of a result of labeling by said labeling unit;
wherein, if said labeling unit determines that the labeling process takes a time not less than a first threshold, said labeling unit executes the labeling process on a color-reduced image or low-resolution image of the received image.

2. The apparatus according to claim 1, wherein said labeling unit:
determines whether the number of colors in the received image is less than a second threshold or not, if said labeling unit determines that the labeling process takes a time not less than the first threshold;
executes the labeling process by using the color-reduced image of the received image, if said labeling unit determines that the number of colors in the received image is not less than the second threshold; and
executes the labeling process on the low-resolution image of the received image, if said labeling unit determines that the number of colors in the image is less than the second threshold.

3. The apparatus according to claim 1, wherein said labeling unit determines whether the labeling process takes a time not less than the first threshold, on the basis of whether an elapsed time of the labeling process is not less than a third threshold.

4. The apparatus according to claim 3, wherein, if the elapsed time of the labeling process is not less than the third threshold, said labeling unit performs the labeling process on a region for which the labeling process has not yet been executed, by using the color-reduced image or the low-resolution image.

5. The apparatus according to claim 1, wherein said labeling unit predicts a time necessary for the labeling process on the basis of a characteristic of the image, and determines on the basis of the predicted time whether the time of the labeling process is not less than the first threshold.

6. The apparatus according to claim 1, wherein said labeling unit:
determines whether the number of edges having edge intensity not less than a fourth threshold in the image is not less than a fifth threshold, if said labeling unit determines that the labeling process takes a time not less than the first threshold;
executes the labeling process by using the color-reduced image of the image, if said labeling unit determines that the number of edges in the image is not less than the fifth threshold; and
executes the labeling process on the low-resolution image of the image, if said labeling unit determines that the number of edges in the image is less than the fifth threshold.

7. The apparatus according to claim 1, wherein the received image is each of a plurality of rectangular images obtained by segmenting a scanned image by a predetermined size.

8. The apparatus according to claim 1, further comprising:
a printing unit adapted to performing a printing process by using the vector data generated by said vectorizing unit.

9. An image processing apparatus, comprising:
at least one processor operable to function as
a labeling unit adapted to execute a labeling process for specifying at least one object region contained in a received image; and
a vectorizing unit adapted to generate vector data on the basis of a result of labeling by said labeling unit;
wherein,
if an amount of the vector data generated by said vectorizing unit is large, one of a color-reduced image and low-resolution image of the received image is used to control said labeling unit and said vectorizing unit to execute the labeling process and a vector data generation process, respectively.

10. The apparatus according to claim 9, wherein, if it is determined that one of said labeling unit and said vectorizing unit takes a processing time not less than a predetermined threshold, one of the color-reduced image and the low-resolution image of the received image is used to control said labeling unit and said vectorizing unit to execute the labeling process and the vector data generation process, respectively.

11. An image processing method, comprising:
a labeling step, which is executed by labeling unit, of executing a labeling process for specifying at least one object region contained in a received image; and
a vectorizing step, which is executed by vectorizing unit, of generating vector data on the basis of a result of labeling by said labeling unit;
wherein, if it is determined in the labeling step that the labeling process takes a time not less than a first threshold, the labeling process is executed on one of a color-reduced image and a low-resolution image of the received image.

12. The method according to claim 11, wherein:
a determination is made in the labeling step as to whether the number of colors in the received image is less than a second threshold or not, if it is determined that the labeling process takes a time not less than the first threshold;
the labeling process is executed by using the color-reduced image of the received image, if it is determined that the number of colors in the received image is not less than the second threshold; and
the labeling process is executed on the low-resolution image of the received image, if it is determined that the number of colors in the image is less than the second threshold.

13. An image processing method, comprising:
a labeling step, which is executed by a labeling unit, of executing a labeling process for specifying at least one object region contained in a received image; and
a vectorizing step, which is executed by a vectorizing unit, of generating vector data on the basis of a result of labeling by said labeling unit;
wherein,
if an amount of the vector data generated in the vectorizing step is large, one of a color-reduced image and a low-resolution image of the received image is used to control said labeling unit and said vectorizing unit to execute the labeling process and a vector data generation process, respectively.

14. A non-transitory computer-readable storage medium storing a computer program which causes a computer to execute:
a labeling step of executing a labeling process for specifying at least one object region contained in a received image; and
a vectorizing step of generating vector data on the basis of a result of labeling of said labeling step;

wherein, if it is determined in said labeling step that the labeling process takes a time not less than a first threshold, the labeling process is executed on one of a color-reduced image and a low-resolution image of the received image.

15. The non-transitory computer-readable storage medium according to claim 14, wherein said labeling step further includes the steps of:

determining whether the number of colors in the image is less than a second threshold or not, if it is determined in said labeling step that the labeling process takes a time not less than the first threshold;

executing the labeling process by using the color-reduced image of the received image, if it is determined in said labeling step that the number of colors in the received image is not less than the second threshold; and executing the labeling process on the low-resolution image of the received image, if said labeling unit determines that the number of colors in the received image is less than the second threshold.

16. A non-transitory computer-readable storage medium storing a computer program which causes a computer to execute:

a labeling step of executing a labeling process for specifying at least one object region contained in a received image; and a vectorizing step of generating vector data on the basis of a result of labeling of said labeling step;

wherein, if an amount of the vector data generated in the vectorizing step is large, one of a color-reduced image and a low-resolution image of the received image is used to execute the labeling process of said labeling step and a vector data generation process of said vectorizing step, respectively.

* * * * *